United States Patent [19]

Danielsen et al.

[11] 4,140,417
[45] Feb. 20, 1979

[54] UNITARY CHANNEL CLAMP FOR COAXIALLY SPACED ROD ENDS

[75] Inventors: Olav D. Danielsen, Middletown; Joseph M. Jacisin, Parsippany, both of N.J.

[73] Assignee: Bell Telephone Laboratories, Incorporated, Murray Hill, N.J.

[21] Appl. No.: 875,211

[22] Filed: Feb. 6, 1978

[51] Int. Cl.² ............................ F16B 2/06; F16B 7/00
[52] U.S. Cl. ...................................... 403/406; 403/300
[58] Field of Search .............. 403/406, 300; 24/81 PE, 24/23 W, 23 R; 248/226.3

[56] References Cited

U.S. PATENT DOCUMENTS

| 379,688 | 3/1888 | Dennis | 403/300 X |
| 2,017,210 | 10/1935 | Kirsch | 403/300 X |
| 2,340,924 | 2/1944 | Boye | 403/406 X |
| 3,897,163 | 7/1975 | Holmes | 403/406 |

FOREIGN PATENT DOCUMENTS 479897  11/1975  U.S.S.R. .................................. 403/406

*Primary Examiner*—Wayne L. Shedd
*Attorney, Agent, or Firm*—Alfred G. Steinmetz

[57] ABSTRACT

A channel formed type unitary clamp is designed to fit over nearly abutting bar ends of cantilevered rack bars which are part of ladder racks used to support cables. The clamp includes locking tabs which are bent to lock the clamp onto the nearly abutting bars and are operative to stabilize the relative end positions of the nearly abutting bar ends.

6 Claims, 6 Drawing Figures

UNITARY CHANNEL CLAMP FOR COAXIALLY SPACED ROD ENDS

BACKGROUND OF THE INVENTION

1. Field of the Invention

This invention concerns clamps to stabilize end-to-end locations of nearly abutting bar or beam structures. It is more specifically concerned with a clamp to stabilize the relative end-to-end positions of nearly abutting beam structures by utilizing prongs or tabs which are bent or deformed to secure the clamp to the beam structures.

2. Description of the Prior Art

Telephone central offices use cable racks to support heavy loads of unsecured cabling on extended runs between separated equipment areas. These cable racks normally have a ladder-type configuration having two long side-rack bars connected by a plurality of cross-frame bars. In order to maintain a safe working area these cable or ladder racks must be securely supported and fastened. At points where one cable rack is joined with another the cantilevered termination of the side rack bars or ends must be clamped to prevent relative motion between them due to the weight of the cable load. A prior art clamping arrangement utilized to secure these relative positions is disclosed in FIG. 1.

FIG. 1 discloses a clamping arrangement which comprises two channel clamps 10 which are positioned opposite each other to clamp the opposite sides of the ends of two nearly abutting rack bars 1 and 2. The two channel clamps 10 each include a centrally drilled hole so that a bolt 11 can be passed between the nearly adjacent rack bar ends to secure the two clamps 10 together and against the opposite sides of the rack bars 1 and 2. This clamping arrangement positively secures or stabilizes the relative end positions of the two rack bars 1 and 2. However, it requires an installation procedure that includes the handling of four separate component parts, namely, two channel clamps, a bolt, and a nut. Assembly requires the two clamps to be positioned to align the bolt holes of the clamps, the bolt to be positioned in place, and finally securing the bolt with a nut by wrench. It is desirable to have a clamp which is embodied in a single, unitary device and which does not require the relatively complicated manual assembly of carefully positioning the clamp to be able to use a bolt and nut and the subsequent securing of the bolt.

SUMMARY OF THE INVENTION

Therefore, in accordance with the principles of this invention, a clamp is embodied in a single, unitary structure. This clamp is utilized to secure the nearly adjacent ends of rack bars to stabilize them with respect to each other. It has a channel configuration in cross section. The inner channel surface of this clamp is positioned circumjacent to three of the four peripheral surfaces of the rack bars by placing it over the two nearly adjacent ends of the rack bars. This unitary clamp has at least a key tab, which is located near to or at its center. The key tab is bent so that when the clamp is placed on the rack bars, the key tab is inserted between the nearly adjacent ends of the rack bars to positively locate the clamp with respect to the ends of the rack bars and prevent the clamp from sliding along the rack bars. Locking tabs formed by longitudinal slits at both ends of the flanges of the channel are bent inward to clamp the rack bars. The locking tabs formed by the longitudinal slits are dimensioned so that the locking tabs, when bent, frictionally engage the surface of the rack bar opposite the channel base. These unitary clamps advantageously secure the relative end positions of rack bars without the necessity of complicated mounting operations and hence significantly improve the productivity of labor.

DETAILED DESCRIPTION

Figure 2:
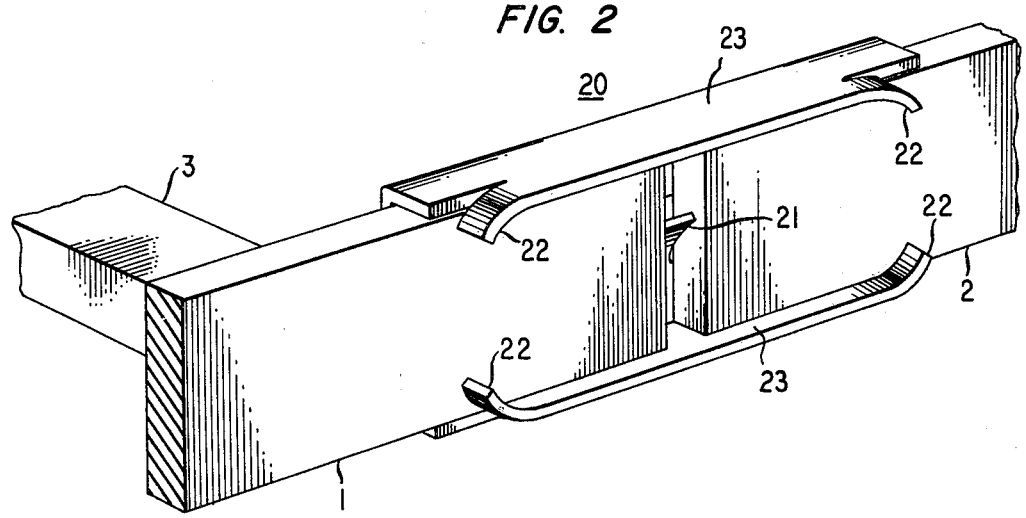
FIG. 2 discloses an isometric view of a unitary clamp embodying the principles of the invention securing the relative positions of two rack bar ends.

The unitary clamp disclosed in FIG. 2 in an isometric view is shown coupled to stabilize the relative end positions of two rack bar ends 1 and 2 of two cable racks. These cable racks are constructed in a ladder form comprising the longitudinal side rack bars 1 and 2 which are cross-connected by cross-frame bars 3 to side-rack bars located at the other end of the cross-frame bars.

As shown in FIG. 2, the two rack bars 1 and 2 have their respective ends nearly adjacent each other. As discussed above, it is desirable to stabilize the relative end positions of the two rack bars 1 and 2. This is accomplished by the application of the unitary clamp 20 to the rack bars as shown in FIG. 2. The position of the unitary clamp relative to the ends of the rack bars 1 and 2 is controlled by the key tab 21 which is bent so that it is positioned between the ends of the two rack bars 1 and 2. This prevents the clamp 20 from sliding along the rack bars.

Figure 3:
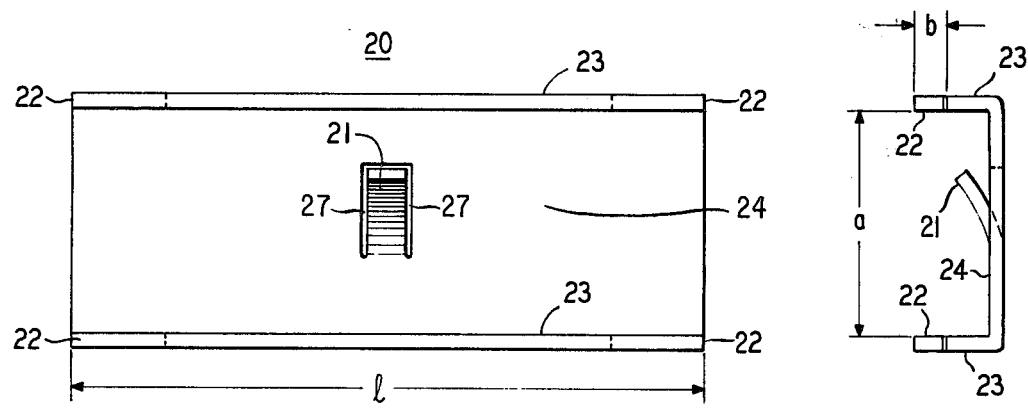
FIG. 3 discloses side and end coordinate views of the unitary clamp disclosed in FIG. 2.

The relative position of the two rack bars is firmly secured by bending the locking tabs 22 so that they lock the rack bars 1 and 2 into the channel of the clamp. The internal dimensions a and b of the channel of clamp 20 as shown in FIG. 3 are selected so that they form a close fit with the outside rectangular height and depth dimensions of the rack bars 1 and 2. Dimension b is selected to permit the locking tabs 22 to frictionally engage the side of the rack bars 1 and 2. Length l of the clamp is selected in accord with the expected cable load. Length l can be readily ascertained by those skilled in the art.

Figure 4:
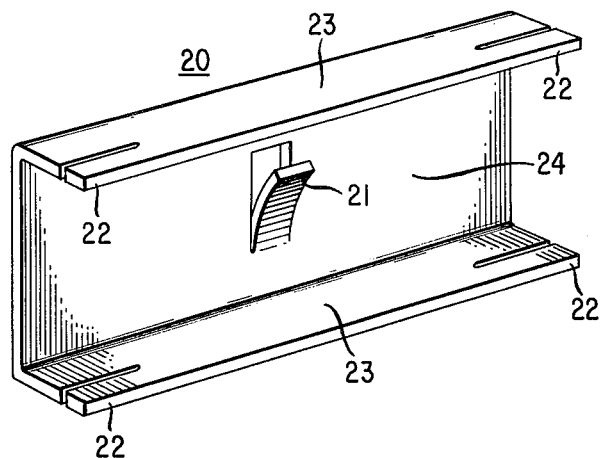
FIG. 4 discloses an isometric view of the unitary clamp disclosed in use in FIG. 2.

The construction of the unitary clamp 20 can be readily ascertained in the coordinate views of the side and end of the clamp as shown in FIG. 3 and the isometric view shown in FIG. 4. Unitary clamp 20 is essentially a channel which may be formed of mild, ductile steel and is formed to have a base plate member 24 with two longitudinal flanges 23 on each side of the base plate. Flanges 23 are bent at right angles to the plane of the base plate. Near the center of the unitary clamp a key tab 21 has been precut with a U-shaped slit 27. As shown in FIGS. 3 and 4, the key tab may be prebent from the plane of the base plate 24. This key tab can also remain unbent until the clamp is to be used where it can be bent out with a punch or other tool, or the key tab may be prebent during the forming process when the clamp is constructed. On each end of the clamp slits are formed in the flange to create the locking tabs 22 which, as described in reference to FIG. 2, are bent after the clamp is placed on the rack bars to secure the clamp to the rack bars and hence stabilize their relative end positions.

Figure 1:
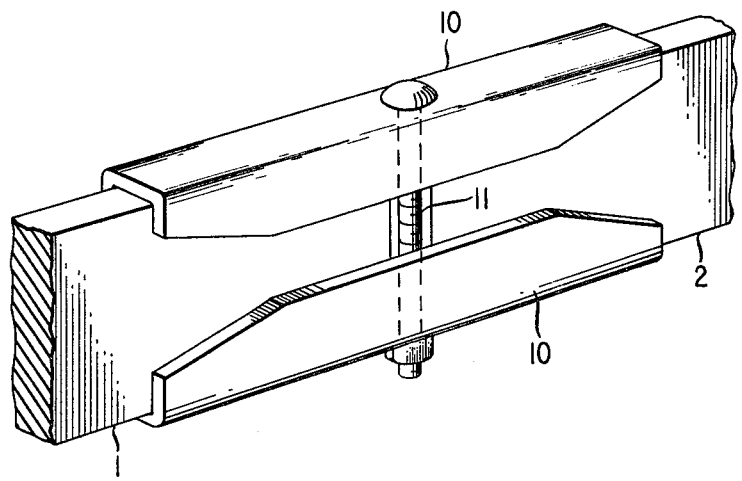
FIG. 1, discussed hereinabove, discloses an isometric view of a prior art clamping arrangement currently utilized in stabilizing the relative end positions of rack bars.

The clamp may be manufactured from a plate of mild, ductile steel by a press punch operation, which generates the slits to define the key and locking tabs. A subsequent press operation can be used to form the channel shape and prebend the key tab. As described above, the channel is placed over the rectangular rack bar ends so that the key tab fits into the space between the nearly adjacent rack bar ends. The locking tabs are then bent to secure the bar to the channel. It is readily apparent to those skilled in the art that the unitary clamp embodying the principles of the invention, if made of comparable dimensioned steel, is as strong as the clamping arrangement disclosed in FIG. 1. Those skilled in the art can easily verify this by subjecting the cross-sectional areas of both the prior art and new clamps to a moment of inertia analysis. It is readily apparent from such an analysis that the moment of inertia of the new unitary clamp exceeds that of the prior art clamp if similarly dimensioned clamp material is used.

Figure 5:
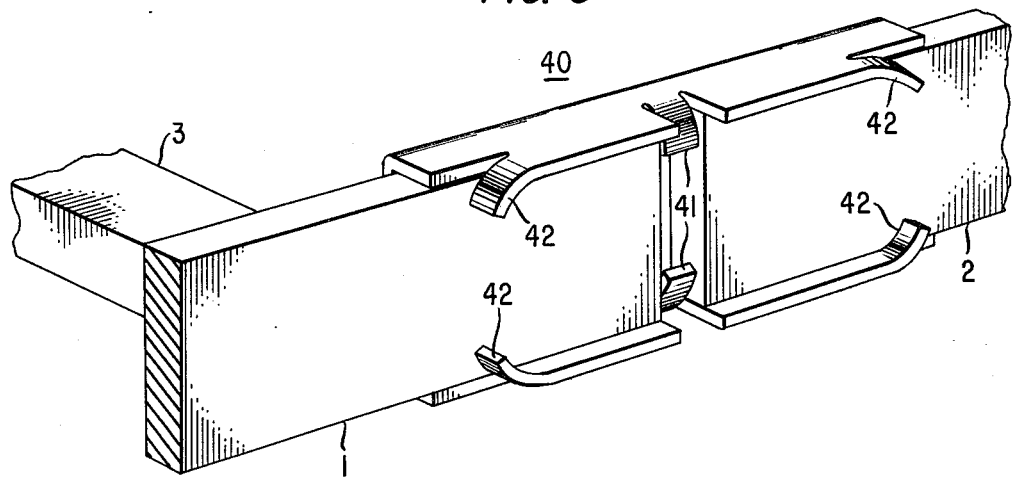
FIG. 5 discloses an isometric view of a unitary clamp of different design from that disclosed in FIG. 2 and embodying the principles of the invention securing the relative positions of two rack bar ends.
Figure 6:
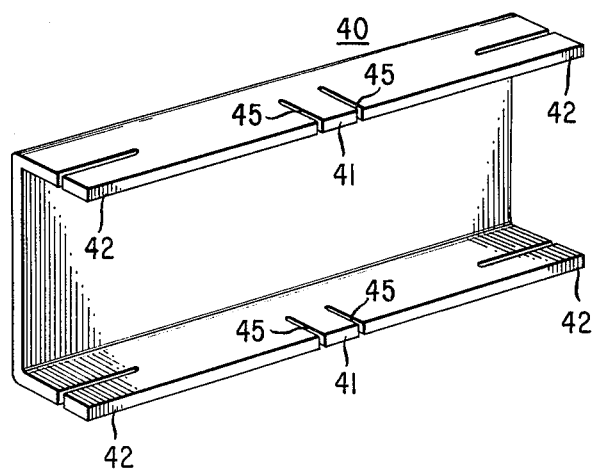
FIG. 6 discloses an isometric view of the unitary clamp disclosed in use in FIG. 4.

An alternative version of a unitary clamp embodying the principles of the invention is disclosed in FIG. 5 where the clamp is shown engaged with the two rack bars 1 and 2 to secure and stabilize their relative end positions. This unitary clamp 40 has locking tabs 42 which are identical in form and function to the locking tabs 22 disclosed in FIG. 2. The difference is that the key tabs 41 to secure the location of the clamps are formed out of the flanges rather than the base plate of the clamp. The construction of this clamp may be easily ascertained by inspection of the isometric view of this clamp shown in FIG. 6 where it is apparent that the key tabs are formed by vertical slits 45 cut into the longitudinal flanges.

The unitary clamps disclosed hereinabove present many advantages in being economical to produce and simple to install, requiring no complicated mechanical connections such as securing a nut to a bolt and carefully positioning the respective bolt holes. It is only necessary to place the clamp on the rack bars after the key tabs have been bent and to subsequently bend the locking tabs to secure it in place.

Many varied arrangements of the unitary clamp embodying the principles of the invention will suggest themselves to those skilled in the art without departing from the spirit and scope of the invention.

What is claimed is:

1. A unitary clamp to stabilize the relative end-to-end positions of two independent bar type members of rectangular cross sections comprising:

a channel type structure having a base plate surface and first and second flanges extending longitudinally along opposite sides of said base plate surface, respectively, locking tabs formed at the opposite ends of the first and second flanges, respectively, at least a key tab located near the longitudinal center of the clamp, whereby the locking tabs are bent to secure said bar type members within the channel defined by said channel type structure and said key tab is bent to secure the position of said channel type structure relative to the end-to-end position of said bar type member.

2. A unitary clamp as defined in claim 1 wherein said locking tabs are formed by longitudinal slits cut into opposite ends of said first and second flanges.

3. A unitary clamp as defined in claim 1 wherein said key tab is formed by a U-shaped slit cut into said base plate surface.

4. A unitary clamp as defined in claim 1 wherein said key tab is formed as first and second transverse slits cut into opposite ends of said first and second flanges, respectively.

5. A clamping device to stabilize the relative end-to-end positions of two independent bar type members of rectangular cross sections comprising:

a channel type structure having a flat surface and first and second flanges extending longitudinally along opposite sides of said flat surface, respectively;

longitudinal slits cut into opposite ends of said first and second flanges, respectively;

a first and second transverse slit cut into each of said first and second flanges and located near a longitudinal center thereof;

whereby said longitudinal slits define locking tabs which are bent to secure said bar type members within a channel defined by said channel type structure and said transverse slits define key tabs which are bent to secure a position of said channel type structure relative to adjacent ends of said bar type members.

6. A clamping device to stabilize the relative end-to-end positions of two independent bar type members of rectangular cross sections comprising:

a channel type structure having a flat surface and first and second flanges extending longitudinally along opposite sides of said flat surface, respectively;

longitudinal slits cut into opposite ends of said first and second flanges, respectively;

a substantially U-shaped slit cut into said flat surface located near a longitudinal center thereof;

whereby said longitudinal slits define locking tabs which are bent to secure said bar type members within the channel defined by said channel type structure and said U-shaped slit defines a key tab which is bent to secure a position of said channel type structure relative to adjacent ends of said bar type members.

* * * * *